United States Patent
McDowell et al.

(10) Patent No.: US 10,691,666 B1
(45) Date of Patent: Jun. 23, 2020

(54) PROVIDING STRONG CONSISTENCY FOR OBJECT STORAGE

(71) Applicant: CloudBD, LLC, Port Washington, NY (US)

(72) Inventors: Shaun McDowell, Mineola, NY (US); Kurt Miller, Port Washington, NY (US)

(73) Assignee: CloudBD, LLC, Port Washington, NY (US)

( * ) Notice: Subject to any disclaimer, the term of this patent is extended or adjusted under 35 U.S.C. 154(b) by 59 days.

(21) Appl. No.: 16/107,776

(22) Filed: Aug. 21, 2018

Related U.S. Application Data

(60) Provisional application No. 62/549,275, filed on Aug. 23, 2017.

(51) Int. Cl.
| | | |
|---|---|---|
| *G06F 13/00* | (2006.01) | |
| *G06F 16/23* | (2019.01) | |
| *G06F 3/06* | (2006.01) | |

(52) U.S. Cl.
CPC .......... *G06F 16/2329* (2019.01); *G06F 3/067* (2013.01); *G06F 3/0619* (2013.01); *G06F 3/0659* (2013.01); *G06F 16/2358* (2019.01)

(58) Field of Classification Search
CPC ........... G06F 12/0828; G06F 16/02329; G06F 16/2358; G06F 3/0619; G06F 3/0659
See application file for complete search history.

(56) References Cited

U.S. PATENT DOCUMENTS

| | | | | |
|---|---|---|---|---|
| 2014/0189270 A1* | 7/2014 | Iwanicki | ............... | G06F 3/0619 711/162 |
| 2017/0054761 A1* | 2/2017 | Schryver | ............. | H04L 61/1511 |
| 2017/0154092 A1* | 6/2017 | Reimer | ................... | G06F 16/13 |
| 2018/0356989 A1* | 12/2018 | Meister | ............... | G06F 11/2089 |
| 2019/0278482 A1* | 9/2019 | Dubeyko | ............ | G06F 12/0246 |

FOREIGN PATENT DOCUMENTS

WO    2018013541 A1    1/2018

OTHER PUBLICATIONS

Fielding et al., "Hypertext Transfer Protocol—HTTP/1.1," Network Working Group, RFC 2616, Jun. 1999, 152 pp.
Rouse, "OpenStack Swift," SearchStorage.com, Jul. 21, 2017, 4 pp.
Rouse, "RESTful API," SearchMicroservices.com, Dec. 8, 2016, 5 pp.

\* cited by examiner

*Primary Examiner* — Sean D Rossiter
(74) *Attorney, Agent, or Firm* — Shumaker & Sieffert, P.A.

(57) ABSTRACT

In one example, a device includes a processor, implemented in circuitry, configured to receive an updated version of an existing storage object to be stored to a distributed data store including one or more remote data storage devices, at least one of the one or more remote data storage devices storing the existing storage object, the existing storage object having a current name representing a current version of the existing storage object, determine an updated name for the updated version of the existing storage object from the current name, the updated name representing the updated version of the existing storage object, and store the updated version of the existing storage object with the updated name to at least one of the one or more remote data storage devices. In this manner, the device may ensure strong concurrency for the storage object.

19 Claims, 5 Drawing Sheets

PROVIDING STRONG CONSISTENCY FOR OBJECT STORAGE

This application claims the benefit of U.S. Provisional Application No. 62/549,275, filed Aug. 23, 2017, the entire content of which is hereby incorporated by reference.

TECHNICAL FIELD

This disclosure relates to storage and retrieval of data in a distributed data store.

BACKGROUND

A Distributed Data Store (DDS) can utilize thousands of disks spread across a large number of servers to function as a single large scalable storage repository. To protect against data loss and to provide increased data availability in the event of disk or server failures, a DDS often creates multiple copies of the data stored within it and disperses the copies across multiple disks, servers and potentially across multiple datacenters. By having multiple copies of data dispersed, the DDS must handle the issues of maintaining data consistency between the copies as updates to the data are made. How the DDS handles these data consistency issues and what consistency guarantees the DDS provides to its clients for various storage operations has substantial impact on both the usability of the storage and the performance of the system.

Two levels of consistency commonly used to describe a DDS are Strong Consistency (SC) and Eventual Consistency (EC). SC guarantees that the latest write will be readable by all clients as soon as the write completes. EC guarantees very little and only provides that eventually the system will have synchronized past the latest write and eventually that write will be readable from all clients but before that future point of time clients can read stale data. Providing SC can increase the complexity of the DDS implementation and introduce additional overhead to operations in order to enforce the consistency. Providing EC decreases the usability of the storage system because all clients that use the storage must be capable of handling stale data for an indeterminate period of time.

Object storage is a type of DDS that provides storage of objects, variably sized chunks of unstructured data associated with unique identifiers, commonly known as the object name. Object storage often provides a hybrid data consistency model with some operations providing SC guarantees and others providing EC guarantees. One such hybrid-consistency model for object storage, used by Amazon S3 and OpenStack Swift, is guaranteeing SC for read-after-create operations and EC for read-after-overwrite operations. This Hybrid-Consistency Object Storage (HCOS) model provides guaranteed availability of all newly created objects to all clients immediately, but modifications to any existing objects can be seen out of order or not at all by clients for a period of time.

SUMMARY

In general, this disclosure describes techniques for providing strong consistency for all objects stored in a distributed data store that conforms to a Hybrid-Consistency Object Storage (HCOS) model. In this disclosure, strong consistency for an object means that after the object has been re-written, the object as most recently re-written will be available for retrieval by any client immediately after the object has been re-written (as opposed to a previous version of the object that was saved before the most recent re-write). This disclosure describes a storage gateway that may be used by a client device to store data in a distributed data store conforming to an HCOS model. In this manner, the techniques of this disclosure may be used to guarantee strong consistency for read-after-create operations and strong consistency for read-after-overwrite operations. Strong consistency guarantees for read-after-overwrite may greatly enhance the usability of the distributed data store conforming to the HCOS model, in that certain clients may be able to use the techniques of this disclosure to store data to the distributed data store that could not otherwise use this distributed data store. Such clients may include clients that are unable to handle reading stale data, e.g., a read-modify-write operation of critical metadata for a filesystem or database, where stale data on the read can cause corruption.

In one example, a method includes receiving, by a processor implemented in circuitry, an updated version of an existing storage object to be stored to a distributed data store including one or more remote data storage devices, at least one of the one or more remote data storage devices storing the existing storage object, the existing storage object having a current name representing a current version of the existing storage object, determining, by the processor, an updated name for the updated version of the existing storage object from the current name, the updated name representing the updated version of the existing storage object, and storing, by the processor, the updated version of the existing storage object with the updated name to at least one of the one or more remote data storage devices.

In another example, a device includes a processor, implemented in circuitry, configured to receive an updated version of an existing storage object to be stored to a distributed data store including one or more remote data storage devices, at least one of the one or more remote data storage devices storing the existing storage object, the existing storage object having a current name representing a current version of the existing storage object, determine an updated name for the updated version of the existing storage object from the current name, the updated name representing the updated version of the existing storage object, and store the updated version of the existing storage object with the updated name to at least one of the one or more remote data storage devices.

In another example, a computer-readable medium, such as a computer-readable storage medium (which may be non-transitory), has stored thereon instructions that, when executed, cause a processor to receive an updated version of an existing storage object to be stored to a distributed data store including one or more remote data storage devices, at least one of the one or more remote data storage devices storing the existing storage object, the existing storage object having a current name representing a current version of the existing storage object, determine an updated name for the updated version of the existing storage object from the current name, the updated name representing the updated version of the existing storage object, and store the updated version of the existing storage object with the updated name to at least one of the one or more remote data storage devices.

The details of one or more examples are set forth in the accompanying drawings and the description below. Other features, objects, and advantages will be apparent from the description and drawings, and from the claims.

DETAILED DESCRIPTION

Figure 1:
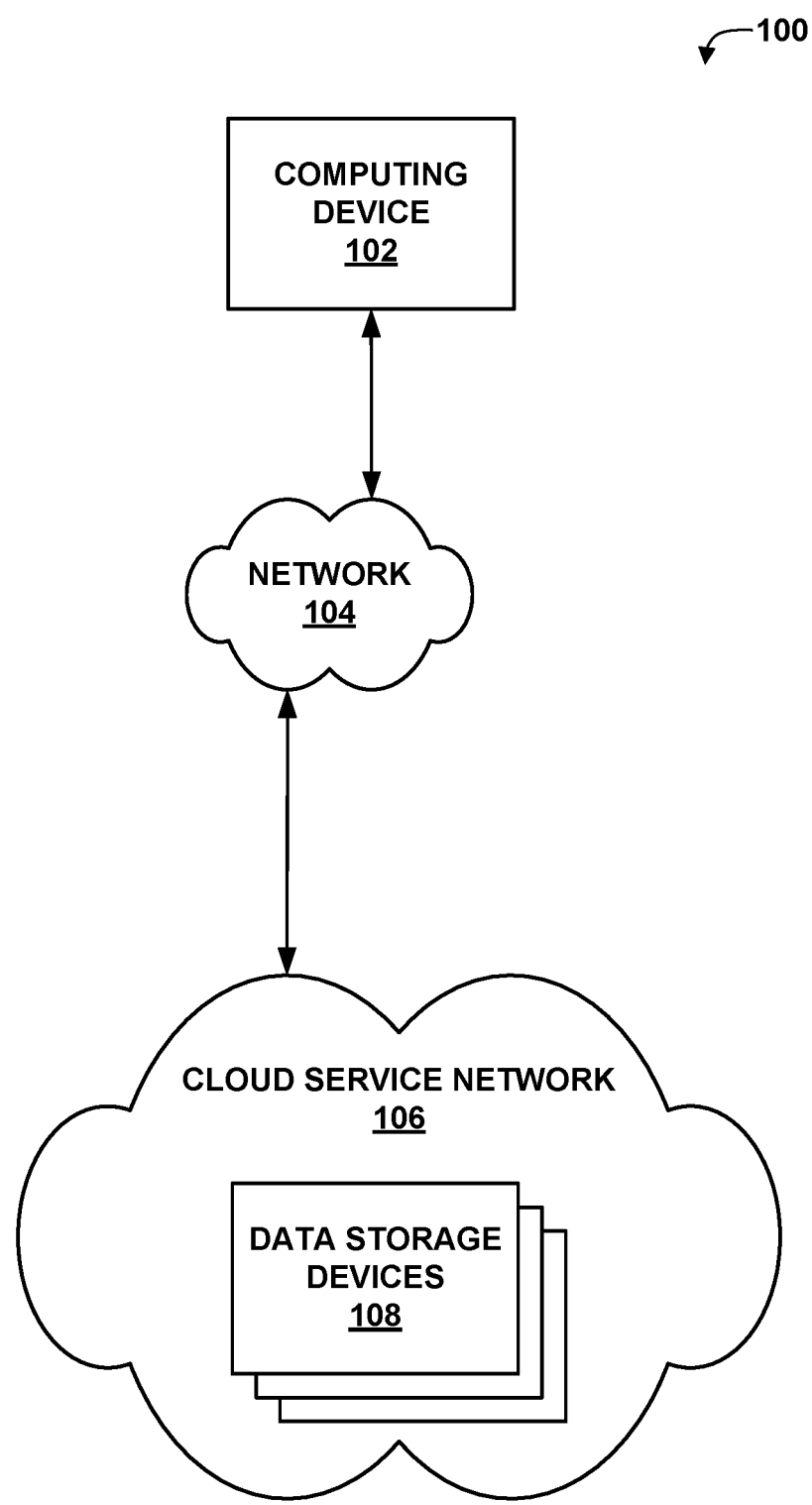
FIG. 1 is a block diagram illustrating an example system in which a computing device stores data to and retrieves data from data storage devices according to the techniques of this disclosure.

In general, this disclosure describes techniques for providing strong consistency for all types of object reads (e.g., read-after-create and read-after-overwrite) from a distributed data store that only provides strong consistency for read-after-create events but eventual consistency for read-after-overwrite events. In particular, rather than overwriting an object on the distributed data store, a computing device implementing the techniques of this disclosure may create new objects each time an existing object is updated. From the perspective of an application manipulating data to be stored as an object to the distributed data store, the object may appear to be overwritten, but the computing device may in fact create new objects to be stored to the distributed data store.

Strong consistency for an object read means that the object is available in its most-recently-written state for all clients immediately after the object has been written. By providing strong consistency for reading an object, all clients will have a most up to date version of the object immediately after the object has been written, whether the object has just been created or has overwritten a previous version of the object. In this manner, the object can be accessed by any client immediately after the object has been written, which may avoid data loss and conflicting reads of different versions of the object. Moreover, these techniques may provide strong consistency even for distributed data stores that only natively provide eventual consistency for reads (that is, no guarantee that a most up to date version of an object will be immediately available after the object has been written). As such, the techniques of this disclosure may improve operation of a computing device, in that the computing device need not wait for a most recent version of an object (such as a file) to be available before reading and possibly overwriting the object. Furthermore, these techniques may improve the technical field of computing devices and distributed data storage systems, in that these techniques may be used to ensure strong consistency.

To differentiate updated versions of objects from each other, this disclosure describes techniques for naming the objects on the distributed data store in a manner that differs from names used by local applications executed on the computing device. For example, a filesystem application may translate file names and their directory hierarchy into full file paths and a block device application may translate block numbers representing the offset from the start of the device into block names. Such file paths and block names may represent an external object name for an object (e.g., a file or block). However, when the computing device stores the object to the distributed data store, the computing device may generate a unique internal name for the object using, e.g., both the external object name and data representative of a current version for the object. The computing device may generate the internal object name as a first portion representing the external object name and a second portion representing the version number, separated by a separating character, such as a dot '.', a hyphen '-', or the like.

For example, a filesystem application may initially generate a file at path "/filename.txt." When the application requests storage of the file, the computing device may generate an internal object name for an object corresponding to the file, using a version value of '1'. Thus, the computing device may store the object to the distributed data store with an internal object name of "/filename.txt.1." When the application (or a different application) executed by the computing device requests retrieval of "/filename.txt," the computing device may search the distributed data store for a most recent version of the object, e.g., by incrementally increasing the version value portion of the internal object name. After identifying an object having a largest version value in the distributed data store, the computing device may retrieve the object and return the object to the requesting application. If the application updates data associated with the object and requests to overwrite the data, the computing device may increment the existing version value and store the updated object to the distributed data store with the file path and the incremented version value as the internal object name. Thus, for example, if the current version value for the object containing the file data at path "/example.txt" is "1", the computing device may store an updated version of the object to the distributed data store using the internal object name "filename.txt.2."

This disclosure also describes techniques for reducing search times for searching for a most recent version of an object, relative to searching version values linearly. Rather than starting from an initial version value of, e.g., "1" and linearly searching each version value afterwards, this disclosure describes techniques for performing a faster search process. An example process for performing such a search is discussed in greater detail below with respect to FIG. 4. Accordingly, these techniques may further improve the functioning of a computer, and the technical field of data storage systems, by improving search times for data objects, such as files.

In this manner, this disclosure describes a computer-implemented system, method, and techniques that may provide a gateway that guarantees strong consistency for read-after-create and read-after-overwrite operations for data stored on a hybrid-consistency object storage. Such techniques may include receiving read and write requests from a client, transforming incoming requests on objects into operations on immutable internal objects stored in the hybrid-consistency object storage, internal object version counting and tracking, a name generating process that receives an external object name, determines a version number, and generates a unique internal object name, a find current internal object version number process using a search algorithm for searching the distributed data store for a most recent version number for the existing storage object, such as a binary existence search algorithm, a sequential existence search algorithm, or other search algorithm, and a cleanup process for removing unneeded old internal objects when newer versions are written.

FIG. 1 is a block diagram illustrating an example system 100 in which a computing device 102 stores data to and retrieves data from data storage devices 108 according to the techniques of this disclosure. In particular, system 100 includes computing device 102 and data storage devices 108, which are communicatively coupled via network 104. Network 104 may represent one or more of a public network (such as the Internet) or a private network. Network 104 may include any of a variety of network devices, such as gateways, routers, switches, bridges, hubs, security devices such as firewalls, or the like.

In the example of FIG. 1, data storage devices 108 are included in cloud service network 106. In general, cloud service network 106 includes a variety of devices (e.g., computer server devices) that provide various services to customers via network 104. In this example, cloud service network 106 includes data storage devices 108, which offer data storage services to customer devices, such as computing device 102. Cloud service network 106 and data storage devices 108 may represent a distributed data store that provides a hybrid consistency object storage (HCOS) model for data storage. That is, in general, data storage devices 108 and cloud service network 106 may provide a data storage service that offers strong consistency for read-after-create operations, but eventual consistency for read-after-overwrite operations. Cloud service network 106 may correspond to Amazon Simple Storage Service (Amazon S3), an OpenStack Object Store (Swift) system, Google Cloud Storage, or the like.

Computing device 102 may execute one or more applications for which strong consistency is important for both read-after-create and read-after-overwrite operations. Thus, computing device 102 may perform the techniques of this disclosure to ensure strong consistency for both read-after-create and read-after-overwrite operations when storing objects to and reading objects from cloud service network 106 and data storage devices 108.

To provide strong consistency guarantees for read-after-overwrite operations, computing device 102 may, according to the techniques of this disclosure, create new internal objects with internal object names generated from an external object name and an internal object version number. In this example, "external" refers to data available to an application that is using data (e.g., a file) and to a storage module (e.g., a driver) executed by computing device 102 configured to store/retrieve the data to/from data storage devices 108, while "internal" refers to data available to the storage module and data storage devices 108, but not to the application that created or modified the object.

The storage module may also be referred to as a storage gateway. The storage gateway executed by computing device 102 may accept object read or object write requests that specify an external object name (e.g., an identifier) for an object. The storage gateway may then determine a current internal object version number associated with the external object name through a cache or a series of existence checks of possible internal objects to data storage devices 108. When the application sends a write request to the storage gateway, the storage gateway creates a new internal object on one or more of data storage devices 108 with an internal object name generated from a next internal version number, the external object name, and an internal name generator.

After a write request from the application, the storage gateway may clean up or replace old internal objects with a suitable marker. That is, the storage gateway may delete old internal objects or their markers that are no longer needed to identify the current internal object version number. The storage gateway may avoid modifying data in internal objects to remove any possibility of reading stale data from an internal object. This allows all read requests to the storage gateway to function as read-after-create operations to the internal objects on the HCOS. The storage gateway generates internal object names such that the names are always unique within the storage domain of data storage devices 108, and therefore, the objects are written as new objects to data storage devices 108, and not as object overwrites.

Non-limiting examples of a name generator executed by the storage gateway include a hash function that hashes the external object name and a current internal version number, and/or a function that appends a separator (e.g., a dot character.', a hyphen character '-', or the like) and the version number between the external object name and the internal version number. The storage gateway may preserve old internal objects or markers so that, in the event of a total loss of the storage gateway or of the internal object version number cache, the internal object version number can be determined through a series of existence checks on possible internal objects (or markers) on data storage devices 108.

In this manner, this disclosure describes a computer-implemented method and system that implement techniques for providing a gateway to one or more storage devices conforming to an HCOS model, where the techniques may guarantee strong consistency for read-after-overwrite and read-after-create operations. In some examples, the techniques include receiving requests to either read an object or to write an object. The techniques may additionally or alternatively include using an internal name generator to convert an external object name (received from an application that requests to read or write the object) and an internal object version number into an internal object name.

The techniques may, additionally or alternatively, include performing a series of existence checks either on marker objects or on old internal objects to storage devices to determine the current internal object version number, if any, for an external object name. The techniques may further include, when processing write requests, generating a new internal object name from the external object name and the next internal object version number determined by an internal name generator. The techniques may also include, when processing write requests, writing the new internal version of the object to one or more of the data storage devices using the generated internal object name. The techniques may further include caching the current internal object version number of the external object name, which may accelerate future read or write requests to this object without needing to re-determine the current internal object version number.

The techniques may include, after processing write requests, removing one or more of the old internal objects (or markers) that are no longer needed for identifying the current internal object version number for this object from, e.g., the cache and/or the storage devices. While processing read requests, these techniques may include generating the current internal object name from the external object name and the identified current internal version number using the internal name generator. The techniques may include, while processing read requests, using the generated current internal object name to retrieve the latest data for this external object name from the storage devices. The techniques of this disclosure may prevent multiple read and write operations to the same external object name from occurring simultaneously, to enforce strong consistency.

As noted above, computing device 102 may include a driver or storage gateway that performs any or all of the techniques of this disclosure. In particular, the driver or storage gateway may be implemented in hardware, software, firmware, or a combination thereof. When implemented in software or firmware, it should be understood that requisite hardware would also be provided to, e.g., store instructions for the software/firmware, and to execute the instructions. Such hardware may include, for example, computer-readable media, such as computer-readable storage media, including any or all of random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. Computer-readable media may also include transitory media as an alternative or addition to storage media, where transitory media may include signals and carrier waves. Thus, computer-readable storage media should be understood as non-transitory. The hardware may additionally or alternatively include one or more processors implemented in circuitry, such as one or more microprocessors, digital signal processors (DSPs), application specific integrated circuits (ASICs), field programmable gate arrays (FPGAs), or any other equivalent integrated or discrete logic circuitry, as well as any combinations of such components.

Although only one computing device 102 is shown in the example of FIG. 1 for purposes of simplicity, it should be understood that many computing devices similar to computing device 102 may be communicatively coupled to data storage devices 108, e.g., via network 104 or directly. Any or all of the computing devices may interact with objects stored on data storage devices 108. The computing devices may each implement the techniques of this disclosure to ensure strong concurrency of objects stored on data storage devices 108 that are accessible to the other computing devices. In this manner, if one of the computing devices writes an object to data storage devices 108, whether a new object or an overwritten object, the other computing devices may access the object immediately in the form that it was most recently written.

When multiple computing devices are provided that access one or more of the same objects, the computing devices may coordinate to avoid writing a new version of an existing object at the same time. For example, if a first computing device and a second computing device read an object with a current name of "example.txt.1," the first and second computing devices could coordinate with each other to prevent the situation of each of the first and second computing devices writing "example.txt.2," which may result in a loss of strong concurrency. Additionally or alternatively, a separate device, such as one of data storage devices 108, may act as an arbitration device for reads and writes of an object to prevent two or more new versions of an object from being written by two or more distinct computing devices. The arbitration device may lock an object that has been checked out by a first computing device, and only allow a write by a second computing device after the first computing device has checked the object back in.

Figure 2:
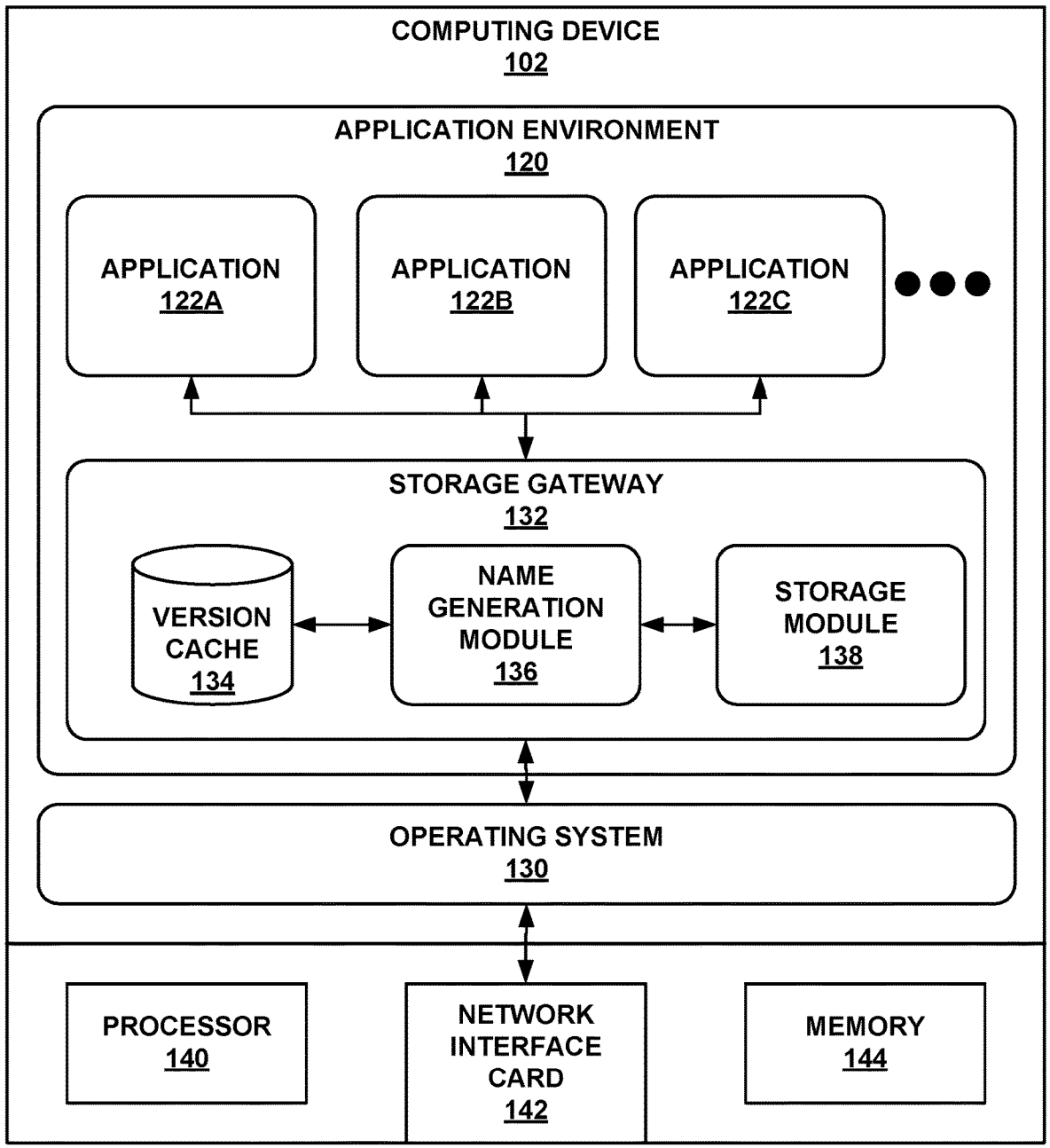
FIG. 2 is a block diagram illustrating an example set of components of the computing device of FIG. 1.

FIG. 2 is a block diagram illustrating an example set of components of computing device 102 of FIG. 1. In this example, computing device 102 includes processor 140, network interface card 142, and memory 144. Processor 140 executes operating system 130 and applications 122A-122C (applications 122) in application environment 120 provided by operating system 130. Application environment 120 further includes storage gateway 132, which includes version cache 134, name generation module 136, and storage module 138. Memory 144 stores instructions for applications 122 and operating system 130 that processor 140 executes, in this example.

Memory 144 may represent any or all of RAM, ROM, PROM, EPROM, EEPROM, flash memory, a hard disk, a CD-ROM, a floppy disk, a cassette, magnetic media, optical media, or other computer-readable storage media. Processor 140 may represent one or more processors implemented in circuitry, such as one or more microprocessors, DSPs, ASICs, FPGAs, or any other equivalent integrated or discrete logic circuitry, as well as any combinations of such components.

In general, network interface card 142 provides network connectivity for computing device 102. In this manner, computing device 102 can send and receive data via a network, such as network 104 of FIG. 1. Accordingly, computing device 102 may send and receive objects via network interface card 142 to and from data storage devices 108 of FIG. 1 over network 104 of FIG. 1.

One or more of applications 122 may require write operations that have strong consistency for both read-after-create and read-after-overwrite operations. In accordance with the techniques of this disclosure, one of applications 122, e.g., application 122A, may initially create or receive some data the application is to store and associate the data with a unique identifier. The unique identifier may further be characterized as an object name. Application 122A may send a request to storage gateway 132 to write an object given some data and an object name. Storage gateway 132 may use the given object name as an external object name. Thus, application 122A may request to access (e.g., create, read, or overwrite) the data (or object) using only its unique identifier (or object name) via storage gateway 132.

In this example, storage gateway 132 may perform the techniques of this disclosure. In particular, in response to receiving the object data and object name from application 122A, to continue the example discussed above, storage gateway 132 may store the object to an external storage device, such as via a storage service provided by cloud service network 106 and data storage devices 108 of FIG. 1. Additionally, storage gateway 132 may exist within application environment 120 and provide storage services to applications 122 or operating system 130 through an operating system module that interfaces with application environment 120, e.g., a fuse filesystem or network block device (NBD). Storage gateway 132 may be implemented as a shared or static library that directly integrates with applications 122. Storage gateway 132 may operate on a different computing device 102B and provide service to applications via a network. Operating system 130 represents any operating system for a client device, such as Linux, Microsoft Windows, Unix, Macintosh Operating System, Android Operating System, or the like.

In general, object storage gateway 132 performs the techniques of this disclosure to store and retrieve objects to/from cloud service network 106 (FIG. 1), and in particular, one or more of data storage devices 108. In this example, storage gateway 132 includes version cache 134, name generation module 136, and storage module 138.

Storage gateway 132 caches a mapping of external object names to current internal version numbers in version cache 134. Data of version cache 134 may be stored in memory 144, e.g., RAM or on persistent storage and may be local to the storage gateway 132 or remote and accessed via network interface card 142. Version cache 134 may be structured as a relational database table including a first column for specifying external object names and a second column specifying most recent version values corresponding to the external object names. Version cache 134 may include fields for marking or flagging entries as dirty before writing new internal objects with incremented version numbers, so that in the event of a communication error while creating the new internal objects, storage gateway 132 will determine to use existence checks to recover the accurate current internal version. In general, version cache 134 includes a mapping of external object names (e.g., unique identifiers used by and available to applications 122) to internal version numbers, and in particular, most recent version numbers for the corresponding objects. Version cache 134 may be persistent or transient, and may be local to computing device 130 or remotely located, and may contain a sub-set or a complete set of the objects currently stored.

Storage gateway 132 may maintain version cache 134 according to a most recently used paradigm. That is, storage gateway 132 may maintain most recently used files/objects in version cache 134, but remove least recently used files/objects from version cache 134, e.g., when a size of version cache 134 meets or exceeds an allocated size in memory 144 for version cache 134. As described in greater detail below, storage gateway 132 may determine a most recent version number for a file/object not in version cache 134 by issuing a series of queries for the file/object with incrementally larger version number values to cloud service network 106 or data storage devices 108.

Name generation module 136 represents an example of an internal name generator, as discussed above, e.g., with respect to FIG. 1. In response to a request specifying a particular external object name for an object (e.g., file) from, e.g., application 122A, name generation module 136 may generate an internal object name for the object. For example, name generation module 136 may initially determine whether the external object name is included in version cache 134. If the external object name is included in version cache 134, name generation module 136 may retrieve a most recent version value to which the external object name is mapped from version cache 134.

On the other hand, if the external object name is not included in version cache 134, name generation module 136 may cause storage module 138 to issue a series of queries to cloud storage network 106 or data storage devices 108, each subsequent query of the series of queries having an incrementally larger version value, until a response to at least one of the queries indicates that the requested object does not exist. An example process for determining the most recent version value for an object is described in greater detail below with respect to FIG. 4.

After determining the most recent version value for an object, name generation module 136 may generate an internal object name for the object using the external object name and the most recent version value. In one example, assuming the request from one of applications 122 is a request to retrieve the object, name generation module 136 concatenates the internal object name and the most recent version value, which may include separating these values by one or more separator characters, such as '.' or '-' or other such characters. In general, such separator characters may be legal characters for object names as recognized by cloud service network 106 and data storage devices 108. In another example, again assuming the request from one of applications 122 is a request to retrieve the object, name generation module 136 may combine the external object name and the most recent version value, and then apply a hash function to these combined values and use the resulting hash value as the internal object name. If the request from one of applications 122 is to overwrite the object, name generation module 136 increments the most recent version value to produce a new most recent version value, stores the new most recent version value to version cache 134 along with an association to the external object name, and otherwise generates the internal object name in the same way (e.g., concatenation and/or hashing). Furthermore, if the object is a new object from one of applications 122, name generation module 138 may generate an initial value for the internal version value, e.g., "1," and storage module 138 may store the external object name and the internal version value to version cache 134.

After name generation module 136 generates an internal object name for an object specified in a request from one of applications 122, e.g., application 122A, storage module 138 issues a corresponding request to, e.g., cloud service network 106 via network interface card 142. Although not shown in FIG. 2, it should be understood that operating system 130 may further include one or more modules for performing network communication and constructing a network stack in order to transmit and receive data via network interface card 142, such as a driver for network interface card 142. Network interface card 142 may be configured to communicate according to one or more of a variety of network protocols, such as Ethernet, and may be configured to communicate using wired or wireless communication media, e.g., according to any of a variety of IEEE 802.11 wireless communication protocols.

Figure 3:
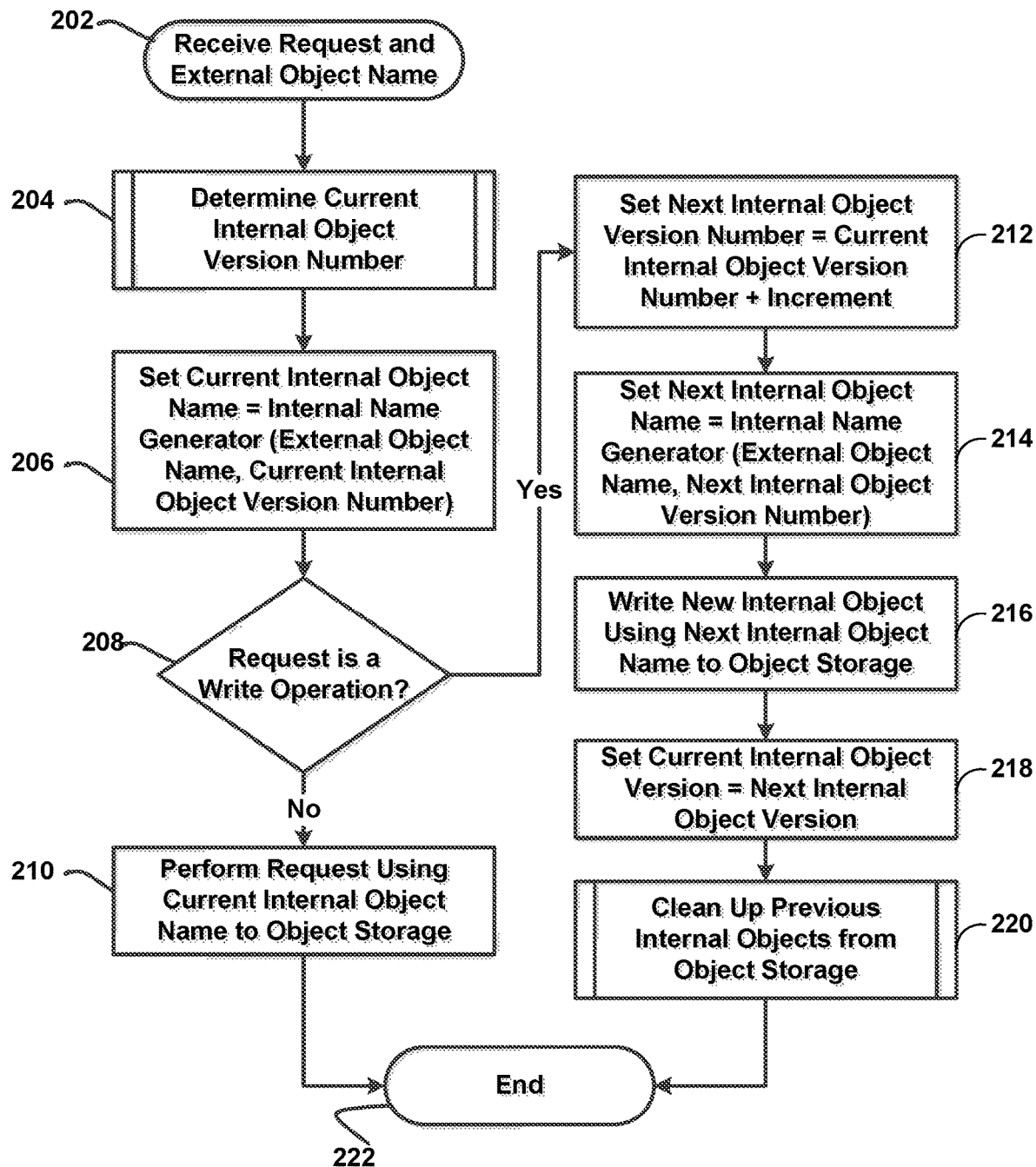
FIG. 3 is a flowchart illustrating an example method for processing a request from an application to store or retrieve an object in accordance with techniques of this disclosure.

FIG. 3 is a flowchart illustrating an example method for processing a request from an application to store or retrieve an object in accordance with techniques of this disclosure. For purposes of example and explanation, the method of FIG. 3 is explained with respect to storage gateway 132 of FIG. 2. However, it should be understood that this or a similar method may be implemented by other devices and in other manners.

In the example of FIG. 3, storage gateway 132 initially receives a request to either read or to write an object with a given external object name (202) from one of applications 122, e.g., 122A. Name generation module 136 performs a process to determine a current internal object version number using the external object name specified in the request (204). In some examples, name generation module 136 may use any search algorithm for searching data storage devices 108 for a most recent version number for the object, assuming the object is currently stored in one or more of data storage devices 108 (i.e., in a distributed data store). For example, as discussed with respect to FIG. 2, name generation module 136 may query version cache 134 to determine whether version cache 134 includes the current internal object version number for the external object name. Additionally or alternatively, name generation module 136 may submit a series of queries to cloud service network 106 (e.g., to data storage devices 108) of FIG. 1 to determine the current internal object version number. An example process for determining the current internal object version number is described in greater detail with respect to FIG. 4 below. If the specified object does not currently exist (e.g., the request is to write a completely new object), name generation module 136 may assign an initialized value (e.g., "1") as the current internal object version number.

Name generation module 136 then uses the external object name and the current internal object version number to determine a current internal object name for the object (206). In particular, name generation module 136 may combine the external object name and the current internal object version number to produce the current internal object name. For example, name generation module 136 may concatenate the external object name and the current internal object version number, and in some examples, may separate the external object name and the current internal object version number with a separation character. In some examples, name generation module 136 may further execute a hash operation on the external object name and the current internal object version number to produce the current internal object name.

In some examples, name generation module 136 may append a separator and the internal version number to the end of the external object name to generate the internal object name. For example, if the external object name for an object is "test_object," the current internal object version number is "100," and the separator character is '/,' name generation module 136 may generate an internal object name of "test_object/100." In other examples, name generation module 136 may use a hash function to generate a suitably unique internal object name using both the external object name and the internal object version number as part of the inputs to the hash. In yet other examples, name generation module 136 uses a hash of the internal object name and concatenates a separator and the version number to the resulting hash value to form the internal object name. In yet other examples, name generation module 136 may use any function that deterministically generates a unique object name from the external object name and a version number.

Storage gateway 132 then determines whether the request from application 122A represents a write operation (208). If the received request is not a write operation (and thus, a read operation) ("No" branch of 208), storage module 138 forwards the read request to an underlying hybrid-consistency object storage (e.g., cloud service network 106 and thereby data storage devices 108) via network interface card 142 using the current internal object name, instead of the external object name as specified in the received request (210).

On the other hand, if the received request is a write operation ("Yes" branch of 208), name generation module 136 increments the current internal object version number (212). Name generation module 136 then updates the current internal object name using the new, incremented internal object version number (214). In some examples, name generation module 136 may further update a hash value representing the current internal object name by re-executing the hash function on the external object name and the incremented internal object version number.

Name generation module 136 then provides the current internal object name to storage module 138, which writes the object with the current internal object name (which includes the incremented version number) to the underlying hybrid-consistency object storage (e.g., cloud service network 106 and thereby data storage devices 108 of FIG. 1) using the new internal object name (216). Storage gateway 132 further updates the current internal object version number in version cache 134 to equal the incremented internal object version number (218). In some examples, e.g., as shown in FIG. 3, storage gateway 132 also executes a cleanup process to delete previous internal objects associated with this external object name (220). An example cleanup process is described with respect to FIG. 5 in greater detail below. In some examples, when storage module 138 writes a new internal object to cloud service network 106, storage module 138 may further replace the previous internal object with an object with the same internal object version name but no other data, to reclaim storage space on cloud service network 106 (e.g., a hybrid consistency cloud storage).

Finally, storage gateway 132 returns data representative of the response from the hybrid-consistency object storage (e.g., cloud service network 106) to the read and/or write operations to application 122A (222). For example, this data may include a retrieved object (e.g., file), a confirmation that the write was successful, or an error indicating that the write was not successful.

In this manner, the method of FIG. 3 is an example of a method including receiving, by a processor implemented in circuitry, an updated version of an existing storage object to be stored to a distributed data store including one or more remote data storage devices, at least one of the one or more remote data storage devices storing the existing storage object, the existing storage object having a current name representing a current version of the existing storage object, determining, by the processor, an updated name for the updated version of the existing storage object from the current name, the updated name representing the updated version of the existing storage object, and storing, by the processor, the updated version of the existing storage object with the updated name to at least one of the one or more remote data storage devices.

Figure 4:
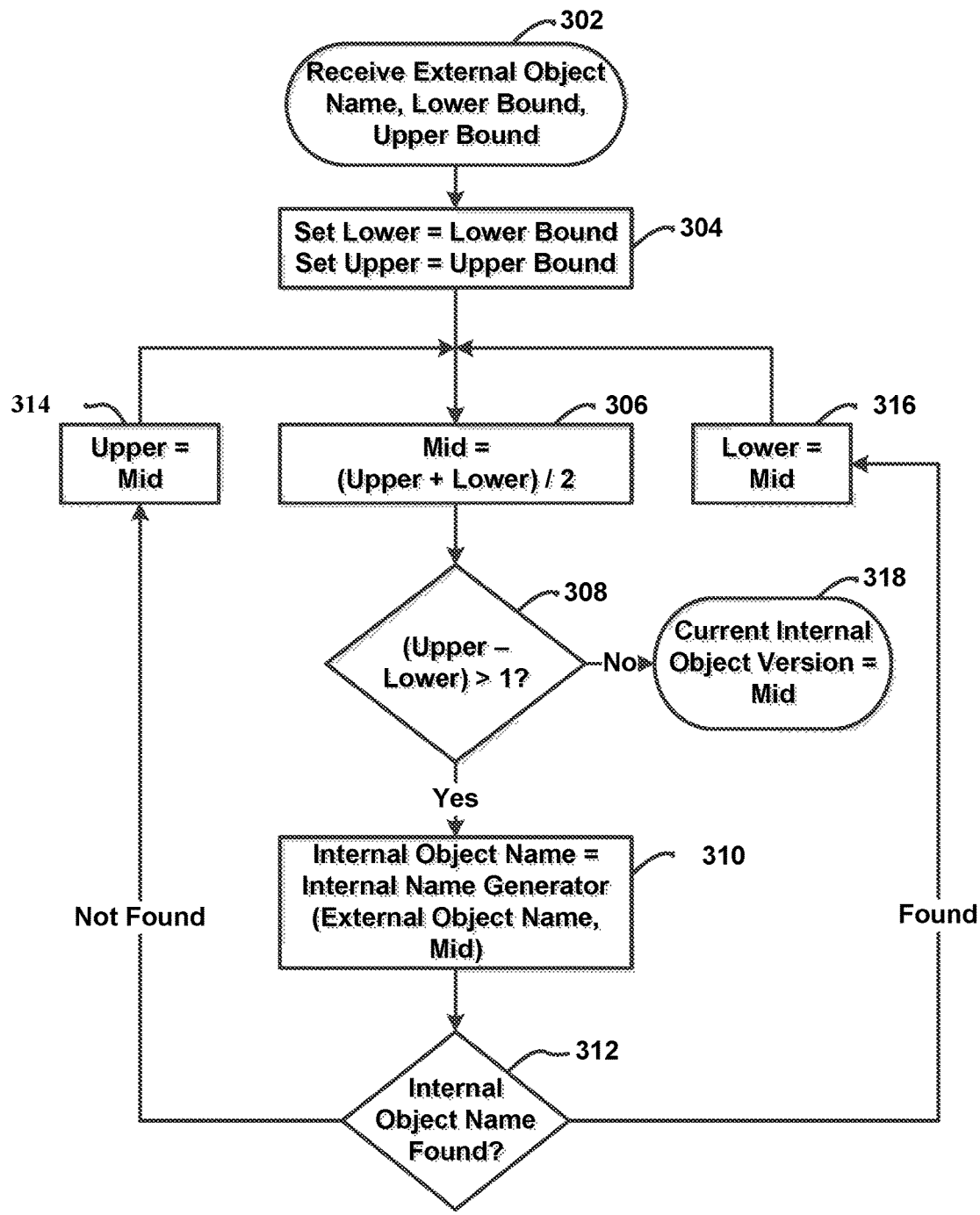
FIG. 4 is a flowchart illustrating an example of a method for determining a current internal object version number according to the techniques of this disclosure.

FIG. 4 is a flowchart illustrating an example of a method for determining a current internal object version number according to the techniques of this disclosure. For purposes of example and explanation, the method of FIG. 4 is explained with respect to storage gateway 132 of FIG. 2. However, it should be understood that this or a similar method may be implemented by other devices and in other manners.

In the example of FIG. 4, name generation module 136 initially receives an external object name, a lower bound value, and an upper bound value (302). The lower bound value may correspond to a minimum possible version number (e.g., zero (0)), and the upper bound value may correspond to a certain upper limit of version values.

Name generation module 136 initializes internal variables "lower" and "upper" such that lower is equal to the received lower bound value and upper is equal to the received upper bound value (304). Name generation module 136 also initializes an internal variable "mid" to the midpoint between "upper" and "lower," i.e., mid=(upper+lower)/2 (306). The midpoint may be represented as an integer value.

In this example, name generation module 136 then determines whether the size of the interval [lower, upper) is greater than one (308). If name generation module 136 determines that the size of this interval is not greater than one ("No" branch of 308), name generation module 136 determines that the current internal object version number is equal to mid (318).

Otherwise, if name generation module 136 determines that the size of the interval [lower, upper) is greater than one ("Yes" branch of 308), name generation module 136 sets a temporary internal object name using the external object name and the current value of mid (310) and determines whether cloud service network 106 is currently storing an object having the temporary internal object name (312). If cloud service network 106 returns an indication that the object is found ("Found" branch of 312), name generation module 136 sets the value of the variable lower equal to mid (316). However, if cloud service network 106 returns an indication that the object is not found ("Not Found" branch of 312), name generation module 136 sets the value of the variable upper equal to mid (314). In either case, name generation module 136 updates the value of mid (306), and proceeds to search per steps 308, 310, 312, and 318. Name generation module 136 continues this search until the size of the range [lower, upper) is not greater than one, per the "No" branch of (308).

In some examples, name generation module 136 performs the method of FIG. 4 as a binary existence search, such that name generation module 136 sets the values of the variables "lower" and "upper" to 0 and a large power of 2, such as $2^{31}$, $2^{32}$, $2^{63}$, or $2^{64}$, respectively. That is, "large power of 2" may be any power of 2 from $2^{31}$ to $2^{64}$, in various examples.

In some examples, name generation module 136 performs the process to find the current internal object version number of FIG. 4 using a sequential existence check of possible internal objects where the returned value is the highest internal object version number found to have an internal object still existing. In another example of this sequential existence check, a minimum value to start the search from is given. In some examples of this sequential existence check, the search begins from version 0. In some examples of this sequential existence check, the search begins from a given version offset. In some examples of this sequential existence check, the search has a max value to check and may check more than one potential internal object in parallel. In some examples, existence checks are performed in parallel and over multiple connections to cloud service network 106.

As shown in FIG. 2, in some examples, name generation module 136 checks a cache, e.g., version cache 134, for a current version number before performing the search process of FIG. 4. Likewise, storage gateway 132 may cache current internal object versions that are found by the method of FIG. 4 in version cache 134, such that the current internal object version is locatable using the corresponding external object name as a lookup key into version cache 134.

Figure 5:
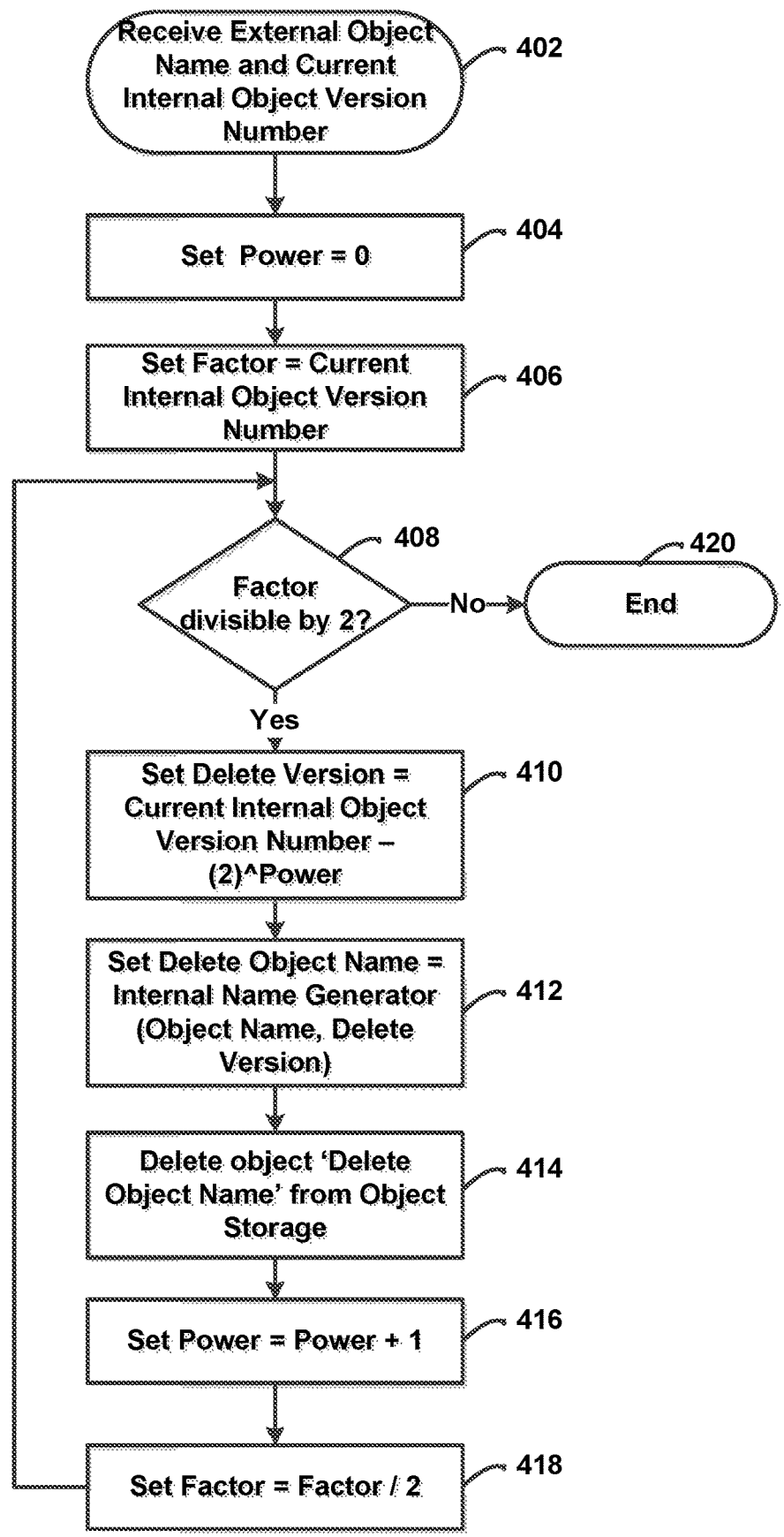
FIG. 5 is a flowchart illustrating an example cleanup process according to the techniques of this disclosure.

FIG. 5 is a flowchart illustrating an example cleanup process according to the techniques of this disclosure. For purposes of example and explanation, the method of FIG. 5 is explained with respect to storage gateway 132 of FIG. 2. However, it should be understood that this or a similar method may be implemented by other devices and in other manners. The method of FIG. 5 may be used to support a find current internal object version number process that uses a binary existence search, e.g., as discussed above with respect to FIG. 4, in which previous versions of internal objects that are key nodes of a binary tree are preserved while others that are no longer needed are deleted.

In the example of FIG. 5, storage module 138 initially receives an external object name and the current internal object version number (402). Storage module 138 initializes a counter variable "Power" to zero (404), which acts as an exponential power-of-2 counter. Storage module 138 also initializes a variable "Factor" equal to the current internal object version number (406) as determined, e.g., using the method of FIG. 4. The variable "Factor" acts as a variable to aid in determining the number of factors of 2 that exist in the current internal object version number.

Storage module 138 then determines whether the value of Factor is divisible by 2 (408). If the value of Factor is not divisible by 2 ("No" branch of 408), storage module 138 ends the cleanup process (420). However, if the value of Factor is divisible by 2 ("Yes" branch of 408), one or more old internal objects may be deleted.

In particular, storage module 138 sets a value of a variable "Delete Version," representing the internal object version number that may be deleted, equal to the current internal object version number $2^{Power}$ (410) (i.e., the current internal object version number minus two raised to the value of Power).

Storage module 138 calls name generation module 136 to generate the internal object name to delete (Delete Object Name), passing the external object name and the value of Delete Version (412) to name generation module 136. Name generation module 136 generates the internal object name from the external object name and the value of Delete Version and returns the internal object name to storage module 138, which stores the name in the Delete Object Name variable. Storage module 138 then deletes the object having the value of the Delete Object Name from cloud service network 106 (414).

After deleting the object, storage module 138 increments the value of Power by setting Power=Power+1 (416), e.g., using "Power++," and reduces the value of the Factor variable by half (e.g., Factor=Factor/2) (418). This process of checking if the value of Factor is divisible by 2 and deleting old internal objects repeats until Factor is no longer divisible by 2 and the cleanup process ends (420).

In some examples, all previous versions of internal objects are left behind in cloud service network 106 and data storage devices 108. In some examples of the cleanup process, to support a find current internal object version number process that uses a sequential existence search with a max window to preserve a lower bound, internal objects with versions less than the current internal object version minus the max window are deleted. In some examples, various cleanup routines may be supported as discussed above, and one or more of the various cleanup routines may be deferred and executed at a later time, sequentially or in parallel, synchronously or asynchronously, on one or more processors.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by a processor implemented in circuitry, a request to overwrite an existing storage object with an updated version of the existing storage object in a distributed data store including one or more remote data storage devices, at least one of the one or more remote data storage devices storing the existing storage object, the existing storage object having a current name representing a current version of the existing storage object, wherein the current name includes data representing an identifier and a current version number, the request specifying data representing the identifier as an object name for the existing storage object excluding the current version number;
determining the current version number according to a search algorithm for searching the distributed data store for a most recent version number for the existing storage object;
determining, by the processor, an updated name for the updated version of the existing storage object from the current name, the updated name representing the updated version of the existing storage object, wherein determining the updated name comprises:
incrementing the current version number to produce a new version number; and
generating the updated name to include data representing the identifier and the new version number; and
storing, by the processor, the updated version of the existing storage object with the updated name to at least one of the one or more remote data storage devices.

2. The method of claim 1, wherein determining the current version number comprises:
sending a first request to access an object to the one or more remote data storage devices, the first request specifying data representing the identifier and a previous version number as a name for the object;
while responses to requests, including the first request, indicate that the requested object exists in at least one of the one or more remote data storage devices, incrementing the previous version number to a temporary intermediate version number and sending an updated request to access an object to the one or more remote data storage devices, the updated request specifying data representing the identifier and the temporary intermediate version number as the name for the object; and
after determining that a response to one of the requests specifying an object having an object name including data representing the identifier and a largest temporary intermediate version number does not exist in the one or more remote data storage devices, determining that the current version number is equal to the largest temporary intermediate version number decremented by one version number.

3. The method of claim 1, wherein determining the current version number comprises:
initializing an upper bound variable to a first value and a lower bound variable to a second value;
calculating a midpoint value between the first value and the second value;
while the difference between a value of the upper bound variable and a value of the lower bound variable is greater than one:
determining whether the one or more remote data storage devices have an object identified by an object name including data representing the identifier and the midpoint value;
when the one or more remote data storage devices have the object identified by the object name including data representing the identifier and the midpoint value, setting the value of the lower bound variable equal to the midpoint value and recalculating the midpoint value; and
when the one or more remote data storage devices do not have the object identified by the object name including data representing the identifier and the midpoint value, setting the value of the upper bound variable equal to the midpoint value and recalculating the midpoint value; and
when the value of the upper bound variable minus the value of the lower bound variable is equal to one, setting the current version number equal to the midpoint value.

4. The method of claim 1, further comprising storing the new version number and a mapping from the identifier to the new version number to a cache.

5. The method of claim 1, further comprising:
receiving a request to access a most recent version of the existing storage object, the request specifying data representing an identifier for the existing storage object;
determining a current version number for the existing storage object according to a search algorithm for searching the distributed data store for a most recent version number for the existing storage object;
sending a request to retrieve the object having an object name including data representing the identifier and the current version number to the one or more remote data storage devices;
receiving the requested object from at least one of the one or more remote data storage devices; and
outputting the received object.

6. The method of claim 1, further comprising:
receiving a request to access a most recent version of the existing storage object, the request specifying data representing an identifier for the existing storage object;
sending a first request to access an object to the one or more remote data storage devices, the first request specifying data representing the identifier and a previous version number as a name for the object;
while responses to requests, including the first request, indicate that the requested object exists in at least one of the one or more remote data storage devices, incrementing the previous version number to a temporary intermediate version number and sending an updated request to access an object to the one or more remote data storage devices, the updated request specifying data representing the identifier and the temporary intermediate version number as the name for the object;
after determining that a response to one of the requests specifying an object having an object name including data representing the identifier and a largest temporary intermediate version number does not exist in the one or more remote data storage devices, determining that a current version number is equal to the largest temporary intermediate version number decremented by one version number;
sending a request to retrieve the object having the object name including data representing the identifier and the current version number to the one or more remote data storage devices;
receiving the requested object from at least one of the one or more remote data storage devices; and
outputting the received object.

7. The method of claim 1, further comprising:
receiving a request to access a most recent version of the existing storage object, the request specifying data representing an identifier for the existing storage object;
initializing an upper bound variable to a first value and a lower bound variable to a second value;
calculating a midpoint value between the first value and the second value;
while the difference between a value of the upper bound variable and a value of the lower bound variable is greater than one:
determining whether the one or more remote data storage devices have an object identified by an object name including data representing the identifier and the midpoint value;
when the one or more remote data storage devices have the object identified by the object name including data representing the identifier and the midpoint value, setting the value of the lower bound variable equal to the midpoint value and recalculating the midpoint value; and
when the one or more remote data storage devices do not have the object identified by the object name including data representing the identifier and the midpoint value, setting the value of the upper bound variable equal to the midpoint value and recalculating the midpoint value;
when the value of the upper bound variable minus the value of the lower bound variable is equal to one, setting a current version number equal to the midpoint value;
sending a request to retrieve the object having an object name including data representing the identifier and the current version number to the one or more remote data storage devices;
receiving the requested object from at least one of the one or more remote data storage devices; and
outputting the received object.

8. The method of claim 1, further comprising sending instructions to the one or more remote data storage devices to delete one or more older versions of the existing storage object.

9. The method of claim 8, wherein sending the instructions to delete the one or more older versions comprises sending requests specifying names for the older versions of the existing storage object, the names including data representing an identifier for the existing storage object and version numbers lower than a current version number for the updated version of the existing storage object.

10. The method of claim 8, wherein sending the instructions comprises determining the older versions of the existing storage object to be deleted, comprising:
initializing a power variable to a value of zero;
initializing a factor variable to a value equal to a most recent version for the existing storage object;
while the factor variable is divisible by two:
determining an older version of the existing storage object using the current version number and the power variable;
sending a request to delete the older version of the existing object to the one or more remote data storage devices;
incrementing the value of the power variable by one; and
setting the value of the factor variable equal to one half of the value of the factor variable.

11. The method of claim 1, wherein the one or more remote data storage devices form part of a distributed data store (DDS) that provides strong consistency for read-after-create operations and eventual consistency for read-after-overwrite operations.

12. A device comprising one or more processors implemented in circuitry and configured to:
receive a request to overwrite an existing storage object with an updated version of the existing storage object in a distributed data store including one or more remote data storage devices, at least one of the one or more remote data storage devices storing the existing storage object, the existing storage object having a current name representing a current version of the existing storage object, wherein the current name includes data representing an identifier and a current version number, the request specifying data representing the identifier as an object name for the existing storage object excluding the current version number;
determine the current version number according to a search algorithm for searching the distributed data store for a most recent version number for the existing storage object;
determine an updated name for the updated version of the existing storage object from the current name, the updated name representing the updated version of the existing storage object wherein to determine the updated name, the one or more processors are configured to:
increment the current version number to produce a new version number; and
generate the updated name to include data representing the identifier and the new version number; and
store the updated version of the existing storage object with the updated name to at least one of the one or more remote data storage devices.

13. The device of claim 12, wherein to determine the current version number, the one or more processors are configured to:
send a first request to access an object to the one or more remote data storage devices, the first request specifying data representing the identifier and a previous version number as a name for the object;
while responses to requests, including the first request, indicate that the requested object exists in at least one of the one or more remote data storage devices, increment the previous version number to a temporary intermediate version number and send an updated request to access an object to the one or more remote data storage devices, the updated request specifying data representing the identifier and the temporary intermediate version number as the name for the object; and
after determining that a response to one of the requests specifying an object having an object name including data representing the identifier and a largest temporary intermediate version number does not exist in the one or more remote data storage devices, determine that the current version number is equal to the largest temporary intermediate version number decremented by one version number.

14. The device of claim 12, wherein to determine the current version number, the one or more processors are configured to:
   initialize an upper bound variable to a first value and a lower bound variable to a second value;
   calculate a midpoint value between the first value and the second value;
   while the difference between a value of the upper bound variable and a value of the lower bound variable is greater than one:
      determine whether the one or more remote data storage devices have an object identified by an object name including data representing the identifier and the midpoint value;
      when the one or more remote data storage devices have the object identified by the object name including data representing the identifier and the midpoint value, set the value of the lower bound variable equal to the midpoint value and recalculating the midpoint value; and
      when the one or more remote data storage devices do not have the object identified by the object name including data representing the identifier and the midpoint value, set the value of the upper bound variable equal to the midpoint value and recalculating the midpoint value; and
   when the value of the upper bound variable minus the value of the lower bound variable is equal to one, set the current version number equal to the midpoint value.

15. The device of claim 12, wherein the one or more processors are further configured to:
   receive a request to access a most recent version of the existing storage object, the request specifying data representing an identifier for the existing storage object;
   send a first request to access an object to the one or more remote data storage devices, the first request specifying data representing the identifier and a previous version number as a name for the object;
   while responses to requests, including the first request, indicate that the requested object exists in at least one of the one or more remote data storage devices, increment the previous version number to a temporary intermediate version number and send an updated request to access an object to the one or more remote data storage devices, the updated request specifying data representing the identifier and the temporary intermediate version number as the name for the object;
   after determining that a response to one of the requests specifying an object having an object name including data representing the identifier and a largest temporary intermediate version number does not exist in the one or more remote data storage devices, determine that a current version number is equal to the largest temporary intermediate version number decremented by one version number;
   send a request to retrieve the object having the object name including data representing the identifier and the current version number to the one or more remote data storage devices;
   receive the requested object from at least one of the one or more remote data storage devices; and
   output the received object.

16. The device of claim 12, wherein the one or more processors are further configured to send instructions to the one or more remote data storage devices to delete one or more older versions of the existing storage object.

17. A computer-readable storage medium having stored thereon instructions that, when executed, cause a processor to:
   receive a request to overwrite an existing storage object with an updated version of the existing storage object in a distributed data store including one or more remote data storage devices, at least one of the one or more remote data storage devices storing the existing storage object, the existing storage object having a current name representing a current version of the existing storage object, wherein the current name includes data representing an identifier and a current version number, the request specifying data representing the identifier as an object name for the existing storage object excluding the current version number;
   determine the current version number according to a search algorithm for searching the distributed data store for a most recent version number for the existing storage object;
   determine an updated name for the updated version of the existing storage object from the current name, the updated name representing the updated version of the existing storage object, wherein the instructions that cause the processor to determine the updated name comprise instructions that cause the processor to:
      increment the current version number to produce a new version number; and
      generate the updated name to include data representing the identifier and the new version number; and
   store the updated version of the existing storage object with the updated name to at least one of the one or more remote data storage devices.

18. A method comprising:
   receiving, by a processor implemented in circuitry, an updated version of an existing storage object to be stored to a distributed data store including one or more remote data storage devices, at least one of the one or more remote data storage devices storing the existing storage object, the existing storage object having a current name representing a current version of the existing storage object;
   determining, by the processor, an updated name for the updated version of the existing storage object from the current name, the updated name representing the updated version of the existing storage object;
   storing, by the processor, the updated version of the existing storage object with the updated name to at least one of the one or more remote data storage devices;
   receiving, by the processor, a request to access a most recent version of the existing storage object, the request specifying data representing an identifier for the existing storage object;
   initializing, by the processor, an upper bound variable to a first value and a lower bound variable to a second value;
   calculating, by the processor, a midpoint value between the first value and the second value;
   while the difference between a value of the upper bound variable and a value of the lower bound variable is greater than one:
      determining, by the processor, whether the one or more remote data storage devices have an object identified by an object name including data representing the identifier and the midpoint value;

when the one or more remote data storage devices have the object identified by the object name including data representing the identifier and the midpoint value, setting, by the processor, the value of the lower bound variable equal to the midpoint value and recalculating the midpoint value; and when the one or more remote data storage devices do not have the object identified by the object name including data representing the identifier and the midpoint value, setting, by the processor, the value of the upper bound variable equal to the midpoint value and recalculating the midpoint value;

when the value of the upper bound variable minus the value of the lower bound variable is equal to one, setting, by the processor, a current version number equal to the midpoint value;

sending, by the processor, a request to retrieve the object having an object name including data representing the identifier and the current version number to the one or more remote data storage devices;

receiving, by the processor, the requested object from at least one of the one or more remote data storage devices; and outputting, by the processor, the received object.

19. A method comprising:

receiving, by a processor implemented in circuitry, an updated version of an existing storage object to be stored to a distributed data store including one or more remote data storage devices, at least one of the one or more remote data storage devices storing the existing storage object, the existing storage object having a current name representing a current version of the existing storage object;

determining, by the processor, an updated name for the updated version of the existing storage object from the current name, the updated name representing the updated version of the existing storage object;

storing, by the processor, the updated version of the existing storage object with the updated name to at least one of the one or more remote data storage devices;

sending, by the processor, instructions to the one or more remote data storage devices to delete one or more older versions of the existing storage object, wherein sending the instructions comprises determining the older versions of the existing storage object to be deleted, comprising:

initializing a power variable to a value of zero;

initializing a factor variable to a value equal to a most recent version for the existing storage object;

while the factor variable is divisible by two:
  determining an older version of the existing storage object using the current version number and the power variable;
  sending a request to delete the older version of the existing object to the one or more remote data storage devices;
  incrementing the value of the power variable by one; and
  setting the value of the factor variable equal to one half of the value of the factor variable.

\* \* \* \* \*